(12) United States Patent
Keith et al.

(10) Patent No.: US 7,583,384 B2
(45) Date of Patent: Sep. 1, 2009

(54) HIGH RESOLUTION IOC DRIVE AND METHOD FOR DRIVING FIBER OPTIC GYROSCOPES

(75) Inventors: Gregory W. Keith, Glendale, AZ (US); Thomas C. Greening, San Jose, CA (US); Lee K. Strandjord, Tonka Bay, MN (US)

(73) Assignee: Honeywell International, Inc., Morristown, NJ (US)

( * ) Notice: Subject to any disclaimer, the term of this patent is extended or adjusted under 35 U.S.C. 154(b) by 292 days.

(21) Appl. No.: 11/495,266

(22) Filed: Jul. 27, 2006

(65) Prior Publication Data

US 2009/0128826 A1    May 21, 2009

(51) Int. Cl.
   *G01C 19/72* (2006.01)
(52) U.S. Cl. ...................................................... 356/464
(58) Field of Classification Search ......... 356/459–463, 356/470, 472–476, 464
   See application file for complete search history.

(56) References Cited

U.S. PATENT DOCUMENTS

| 5,351,123 | A | * | 9/1994 | Spahlinger | .................... 356/464 |
| 5,949,545 | A | * | 9/1999 | Lo et al. | ...................... 356/464 |
| 6,002,481 | A | | 12/1999 | Bielas et al. | |
| 7,167,250 | B2 | * | 1/2007 | Chen et al. | ................... 356/464 |
| 2003/0202187 | A1 | * | 10/2003 | Lange et al. | ................. 356/464 |
| 2007/0242276 | A1 | * | 10/2007 | Hughes et al. | ............... 356/461 |

FOREIGN PATENT DOCUMENTS

| EP | 0418539 | 3/1991 |
| JP | 08327372 | 12/1996 |
| JP | 2005257635 | 9/2005 |

OTHER PUBLICATIONS

European Search Report for Application No. 07113316.9 dated Nov. 26, 2007.

* cited by examiner

*Primary Examiner*—Patrick J Connolly
*Assistant Examiner*—Scott M Richey
(74) *Attorney, Agent, or Firm*—Black Lowe & Graham, PLLC

(57) ABSTRACT

Methods and system are provided for driving light through a sensing coil of an optical gyro. The system includes a photodetection circuit having an input for receiving an optical output from the sensing coil and having an output, and a signal processing circuit having an input coupled to the output of the photodetection circuit and having an output for supplying an output signal to modulate the sensing coil. The photodetection system produces a digital signal from the optical output. The signal processing circuit produces a feedback signal from the digital signal and adds a random number to the feedback signal to produce the output signal.

16 Claims, 3 Drawing Sheets

HIGH RESOLUTION IOC DRIVE AND METHOD FOR DRIVING FIBER OPTIC GYROSCOPES

FIELD OF THE INVENTION

The present invention generally relates to gyro systems, and more particularly relates to modulating optical signals in interferometric fiber optic gyros (IFOGs).

BACKGROUND OF THE INVENTION

Gyros have been used to measure rotation rates or changes in angular velocity about an axis of rotation. A basic conventional fiber optic gyro (FOG) includes a light source, a beam generating device, and a coil of optical fiber coupled to the beam generating device that encircles an area about a sensing axis. The beam generating device transmits light beams into the coil that propagate in a clockwise (CW) direction and a counter-clockwise (CCW) direction along the core of the optical fiber and both ultimately impinge on a photodetector (e.g., a photodiode electrically coupled to a photodetection system). Many FOGs utilize glass-based optical fibers that conduct light along a solid glass core of the fiber. The two counter-propagating (e.g., CW and CCW) beams experience different optical pathlengths while propagating around a rotating closed optical path or loop. For example, rotation about the sensing axis increases the optical path length in one rotational direction and decreases the optical path length in the other rotation direction. The difference in the two optical pathlengths introduces a phase shift between the light beams for either rotation direction (i.e., the Sagnac effect), and this difference is proportional to the rotational rate that is normal to the enclosed area.

The phase difference between the counter-propagating light beams in the loop is typically modulated to increase sensitivity to rotation detection using an optical phase modulator coupled with a bias signal generator. The optical phase modulator may be operated in a feedback loop from the photodetection system to provide sufficient negative feedback for canceling the phase shift difference, between the counter-propagating light beams, resulting from a rotation about the sensing axis. In one example, a phase-sensitive detector receives a signal representing the photodetector output current and provides an indication of the relative phase of the light beams impinging on the photodetector. Any significant signal content recovered by the phase-sensitive detector at the modulation frequency is proportional to the rotation rate. The signal from the phase-sensitive detector may be used to phase shift one light beam relative to the other beam to bring the counter-propagating beams in phase with each other. For example, the signal from the phase-sensitive detector may be supplied to servo electronics having an accumulator, such as an integrator. In response to the phase differences generated during rotation, the servo electronics supplies a signal to phase shift one light beam relative to the other beam. In digital implementations of the feedback loop, an analog-to-digital converter (ADC) converts the analog output of the photodetector to a digital equivalent (e.g., for use by the phase-sensitive detector), and a digital-to-analog converter (DAC) converts the digital signal from the servo electronics to an analog signal for phase shifting via the optical phase modulator.

At very low rotation rates and near zero degrees phase detection, plus or minus some pre-determined value, the gyroscope is generally less sensitive to phase detection. This region is referred to as a "deadband," and deadband errors may occur for a number of reasons. One source of deadband results from the truncation of digital signals from the servo electronics to lower bit values prior to supplying the digital signal to the DAC. This truncation can also introduce an asymmetry that, in the presence of vibration, could rectify into rate error. Additionally, loop error may take a significant amount of time to converge to the appropriate phase shift, and this time for convergence may be further extended with the truncation of signals supplied to the DAC.

Accordingly, it is desirable to provide a closed-loop optical gyro that decreases closed loop errors. In addition, it is desirable to provide a method for determining a rotation rate of a resonator gyro having decreased closed loop errors. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

Methods and systems are provided for driving light through a sensing coil of an optical gyro. In an exemplary embodiment, a system is provided for driving a sensing coil comprising a photodetection circuit having an input for receiving an optical output from the sensing coil and having an output, and a signal processing circuit having an input coupled to the output of the photodetection circuit and having an output for supplying an output signal to modulate the sensing coil. The photodetection system produces a digital signal from the optical output. The signal processing circuit is configured to produce a feedback signal from the digital signal and further configured to add a random number to the feedback signal to produce the output signal.

In another exemplary embodiment, an optical gyro is provided comprising a sensing coil circuit having an input and an output, a photodetection circuit having an input coupled to the output of the sensing coil circuit and having an output, and a signal processing circuit having an input coupled to the output of the photodetection circuit and having an output coupled to the input of the sensing coil circuit. The sensing coil circuit is configured to produce an optical output having a phase difference proportional to a rotational rate of the optical gyro. The photodetection circuit is configured to produce a digital signal representing the optical output. The signal processing circuit configured to produce a feedback signal from the digital signal and further configured to transmit an output signal to the sensing coil circuit for canceling the phase difference of the optical output. The output signal is derived from a combination of the feedback signal and a random number.

In another exemplary embodiment, a method for operating a sensing coil of an optical gyro is provided comprising the steps of generating a rate signal from an optical output of the sensing coil, accumulating the rate signal to produce a first accumulated signal, deriving a modulation signal from a combination of the first accumulated signal and a random number, and modulating the sensing coil in response to the modulation signal.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

The present invention is a method and system for driving light through a sensing coil of an optical gyro. The sensing coil circulates input light beams in counter-propagating directions and produces an optical output that is used to detect the rotation rate of the optical gyro. In one exemplary embodiment, the optical gyro includes, but is not limited to, a rate feedback loop for determining a drive signal for modulating the input light beams. During the course of determining the drive signal, a number of operations are performed using digital representations The rate feedback loop produces a rate accumulated signal from the optical output from the sensing coil. The rate accumulated signal is used to determine the drive signal, and random noise (e.g., a random number) is added to the rate accumulated signal or a subsequent signal derived from the rate accumulated signal during the determination of the drive signal. The resultant signal is then converted to an analog signal. Adding the random noise during the process of determining the drive signal (e.g., subsequent to calculating the rate accumulated signal), effectively increases the resolution of the resultant drive signal, reduces deadband that may result from truncation during the determination of the drive signal, and reduces quantization noise that may occur during conversion to the analog signal.

Figure 1:
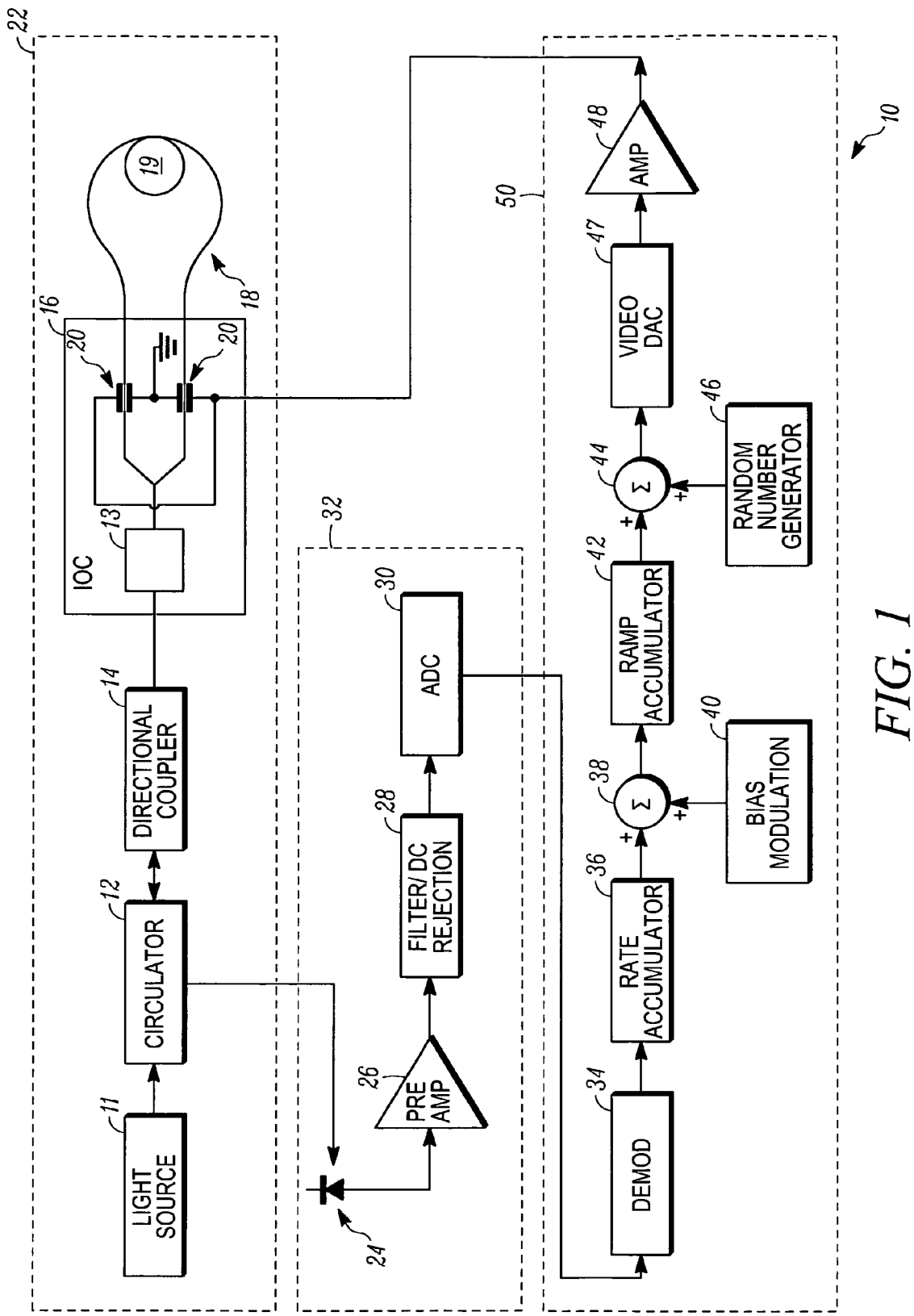
FIG. 1 is a block diagram of an optical gyro in accordance with an exemplary embodiment of the present invention.

Referring now to the drawings, FIG. 1 is a block diagram of an optical gyro 10 in accordance with an exemplary embodiment of the present invention. The optical gyro 10 is an interferometric fiber optic gyro (IFOG) and comprises an optical circuit 22 that circulates counter-propagating light beams (e.g., clockwise (CW) and counter-clockwise (CCW)) through a sensing coil 18 and produces an optical output from the circulating light beams, a photodetection circuit 32 that receives the optical output from the optical circuit 22 and converts the optical output to substantially equivalent digital signals, and a signal processing circuit 50 having an input coupled to an output of the photodetection circuit 32 and having an output coupled to an input of the optical circuit 22. The signal processing circuit 32 produces a drive signal from the digital signals, and the drive signal controls the modulation applied to the circulating light beams. In the absence of rotation, the round-trip path-lengths of the CW and CCW beams inside the sensing coil 18 in the CW and CCW direction, respectively, are substantially equal. In the presence of rotation (i.e., rotation of the sensing coil 18 about a sensing axis 19 encircled by the sensing coil 18), the round-trip path-lengths differ between the CW and the CCW directions producing a phase difference between the two counter-propagating light beams that is proportional to the rotation rate. The signal processing circuit 50 detects the phase difference between the counter-propagating light beams, and the drive signal is determined by the signal processing circuit 50 to cancel this phase difference. Although the optical gyro 10 is configured as an IFOG, the optical gyro 10 may be configured as another type of optical gyroscope, such as a resonator fiber optic gyro (RFOG) and the like.

The optical circuit 22 comprises a tunable light source 11 (e.g., a tunable laser) that synthesizes a light beam, a circulator 12 (e.g., a highly reflective mirror with low but non-zero transmittance) receiving the light beam from the light source 11, a directional coupler 14 receiving the light beam from the circulator 12, a beam splitter 13 receiving the light beam from the directional coupler 14 and dividing this light beam into two input light beams, a modulator 20 for phase modulating the two input light beams, and a sensing coil 18 coupled to the modulator 20 for circulating the input light beams. The two light beams provided by the beam splitter 13 circulate through the sensing coil 18 in counter-propagating directions (e.g., clockwise (CW) and counter-clockwise (CCW)). In this exemplary embodiment, the beam splitter 13 and modulator 20 are incorporated in an integrated optics chip (IOC) 16 which may include additional electronic devices for analyzing the spectral characteristics of the circulating light beams (e.g., detecting phase shifts between the counter-propagating light beams which indicate rotation of the optical gyro 10). The light source 11, circulator 12, directional coupler 14, IOC 16, and sensing coil 18 together form an optical circuit 22. The optical circuit 22 may include other components such as one or more photodetectors that sample light circulating out the sensing coil 18, and additional mirrors and beam splitters for directing the propagation of light beams among the various components of the optical circuit 22.

The phase difference between the counter-propagating light beams resulting from rotation is modulated by the modulator 20. For example, the modulator 20 applies a bias frequency by a sinusoidal or square wave modulation of the differential phase between the counter-propagating beams. After circulating the sensing coil 18, the optical output (e.g., circulated light beams from the CW and CCW direction) is received by the directional coupler 14 and passed to the circulator 12. The directional coupler 14 isolates the input light beams (e.g., from the circulator 12) from the optical output (e.g., the circulated light beams from the CW and CCW direction) of the sensing coil 18, and the circulator 12 directs the optical output to the photodetection circuit 32.

The photodetection circuit 32 converts the optical output from the circulator 12 to a digital representation of the optical output. In one exemplary embodiment, the photodetection circuit 32 comprises a photodiode 24 for converting the optical output to a current, a pre-amplifier 26 having an input coupled to the photodiode 24 that produces an amplified signal from the current, a signal conditioning circuit 28 having an input coupled to an output of the pre-amplifier 26, and an analog-to-digital converter (ADC) 30 having an input coupled to an output of the signal conditioning circuit 28. The signal conditioning circuit 28 applies anti-aliasing, filtering, and direct current (DC) rejection to the amplified signal and may perform other functions to prepare the analog signal for conversion by the ADC 30. The ADC 30 produces a digital signal representing the optical output received by the photodiode 24.

The signal processing circuit 50 comprises a demodulator 34 having an input coupled to an output of the ADC 30 that extracts the relevant amplitudes of the digital signal to provide an indication of the relative phase of the light beams received by the photodiode 24, a rate accumulator 36 having an input coupled to an output of the demodulator 34, a bias signal generator 40 that produces a bias modulation signal, a first summing unit 38 having a first input coupled to an output of the rate accumulator 36 and having a second input coupled to the bias signal generator 40, a ramp accumulator 42 having an input coupled to an output of the bias signal generator 40, a random number generator 46, a second summing unit 44 having a first input coupled to an output of the ramp accumulator 42 and having a second input coupled to the random number generator 46, a video digital-to-analog converter (DAC) 47 having an input coupled to an output of the summing unit 44, and an amplifier 48 having an input coupled to an output of the video DAC 47 and having an output coupled to the modulator 20. The signal processing circuit 50 may also include additional components for determining the magnitude of the phase difference between the counter-propagating light beams based on the digital signal from the photodetection circuit 32.

To determine the relative phase of the circulating light beams, the demodulator 34 extracts the amplitudes at the fundamental frequency of the photodiode 24 output or at the fundamental frequency of the bias signal. The rate accumulator 36 accumulates the output of the demodulator 34 to generate a ramp signal that is then added with the bias modulation signal at the summing unit 38. The ramp accumulator 42 accumulates the output of the summing unit 38, and the summing unit 44 adds this accumulated output with a random number to produce a digital modulation signal for canceling the phase difference of the circulating light beams. The digital modulation signal is then converted to an analog equivalent signal by the video DAC 47 and subsequently amplified by the amplifier 48 to produce the drive signal.

In an exemplary embodiment, the signal processing of the demodulator 34, rate accumulator 36, ramp accumulator 42, and the summing units 38 and 44 are preferably performed at a resolution (e.g., twenty-three (23) bit resolution) that is greater than the resolution of the video DAC 47 (e.g., eight (8) or fourteen (14) bit resolution). Although the size of the random number may vary up to the resolution of the digital modulation signal, the size of the random number is preferably the difference between the calculation resolution and the resolution of the video DAC 47. The lower resolution video DAC 47 truncates the higher resolution digital modulation signal when converting to an analog equivalent. Using a lower resolution DAC reduces the costs generally associated with greater resolution DACs. Additionally, the digital modulation signal received by the video DAC 47 effectively has random noise that increases the resolution thereby reducing quantization noise and DAC integral non-linearity.

In response to the drive signal from the signal processing circuit 50, the modulator 20 shifts the phase(s) of the light beams circulating through the sensing coil 18 to cancel the phase difference produced from the rotation of the sensing coil 18 around the sensing axis 19. For example, the modulator 20 changes the index of refraction or the physical length of the optical fiber, thereby changing the optical path lengths, to introduce a phase difference in the light beams circulating through the sensing coil 18. In operation, the phase difference changes between the counter-propagating light beams due to rotation will vary relatively slowly compared with the phase difference changes due to the modulator 20. The video DAC 47 can be updated once or multiple times per half period of the time for the light beams to travel through the sensing coil 18 (e.g., a loop transit time to travel a single optical path length or loop of the sensing coil 18).

Figure 2:
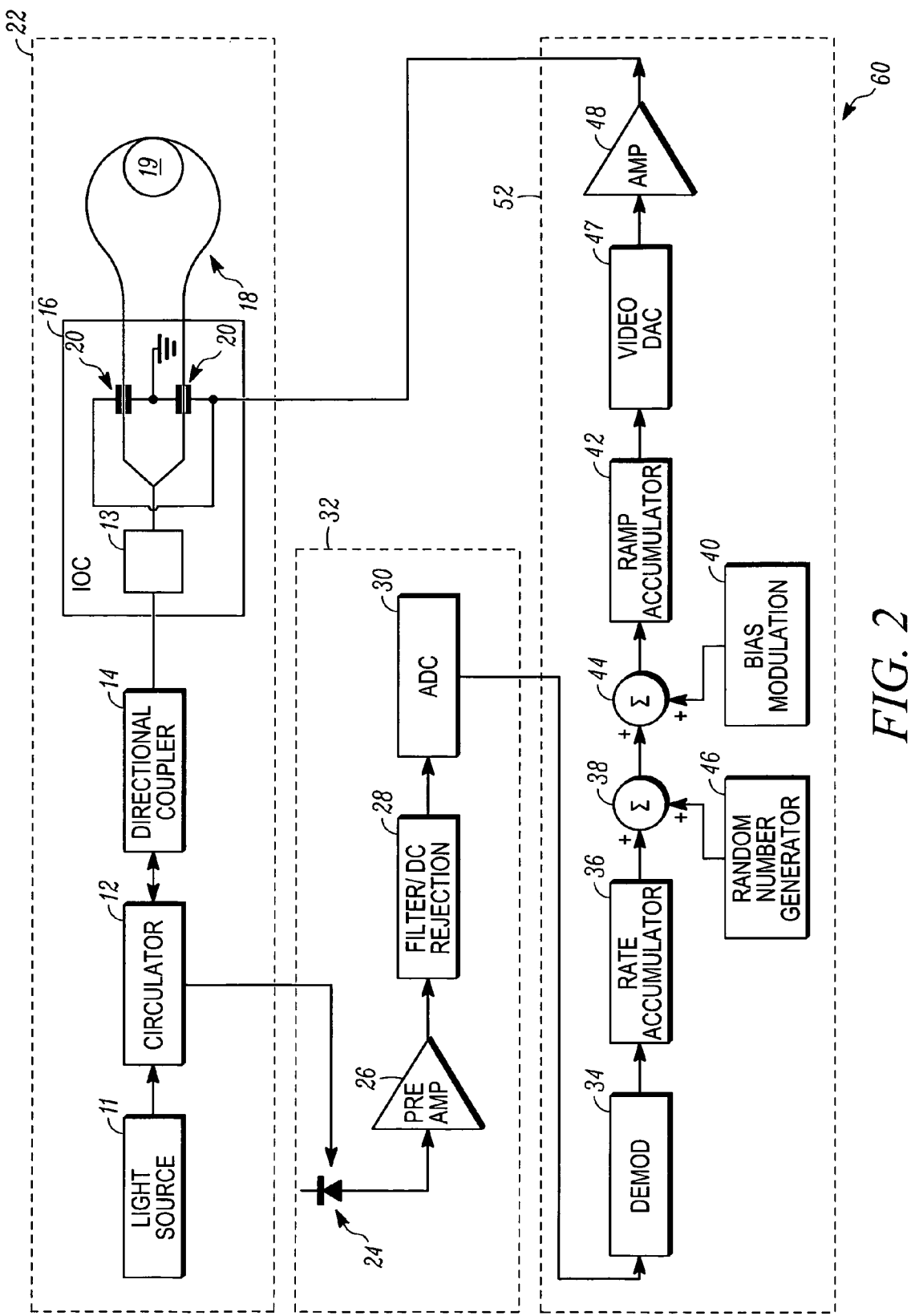
FIG. 2 is a block diagram of an optical gyro in accordance with another exemplary embodiment of the present invention.

FIG. 2 is a block diagram of an optical gyro 60 in accordance with another exemplary embodiment of the present invention. In this exemplary embodiment, the random number is added to the calculation of the digital modulation signal at a different point than in the signal processing circuit 50 shown in FIG. 1. In addition to the optical circuit 22 and the photodetection circuit 32, the optical gyro 60 comprises a signal processing circuit 52 having an input coupled to the output of the photodetection circuit 32 and having an output coupled to the input of the optical circuit 22. The signal processing circuit 52 comprises a different configuration, following the output of the rate accumulator 36, of the same components of the signal processing circuit 50 shown in FIG. 1. The inputs of the first summing unit 38 are coupled to the outputs of the rate accumulator 36 and the random number generator 46, respectively, and the inputs of the second summing unit 44 are coupled to the outputs of the first summing unit 38 and the bias signal generator 40, respectively. The input of the ramp accumulator 42 is coupled to the output of the second summing unit 44, the input of the video DAC 47 is coupled to the output of the ramp accumulator 42, and the input of the amplifier 48 is coupled to the output of the video DAC 47. Although the random noise is added at the first summing unit 38 of the signal processing circuit 52, the random noise can be added at any point subsequent to the accumulation of demodulated signal and prior to supplying the digital demodulation signal to the video DAC 47 during the process of calculating the digital modulation signal.

Figure 3:
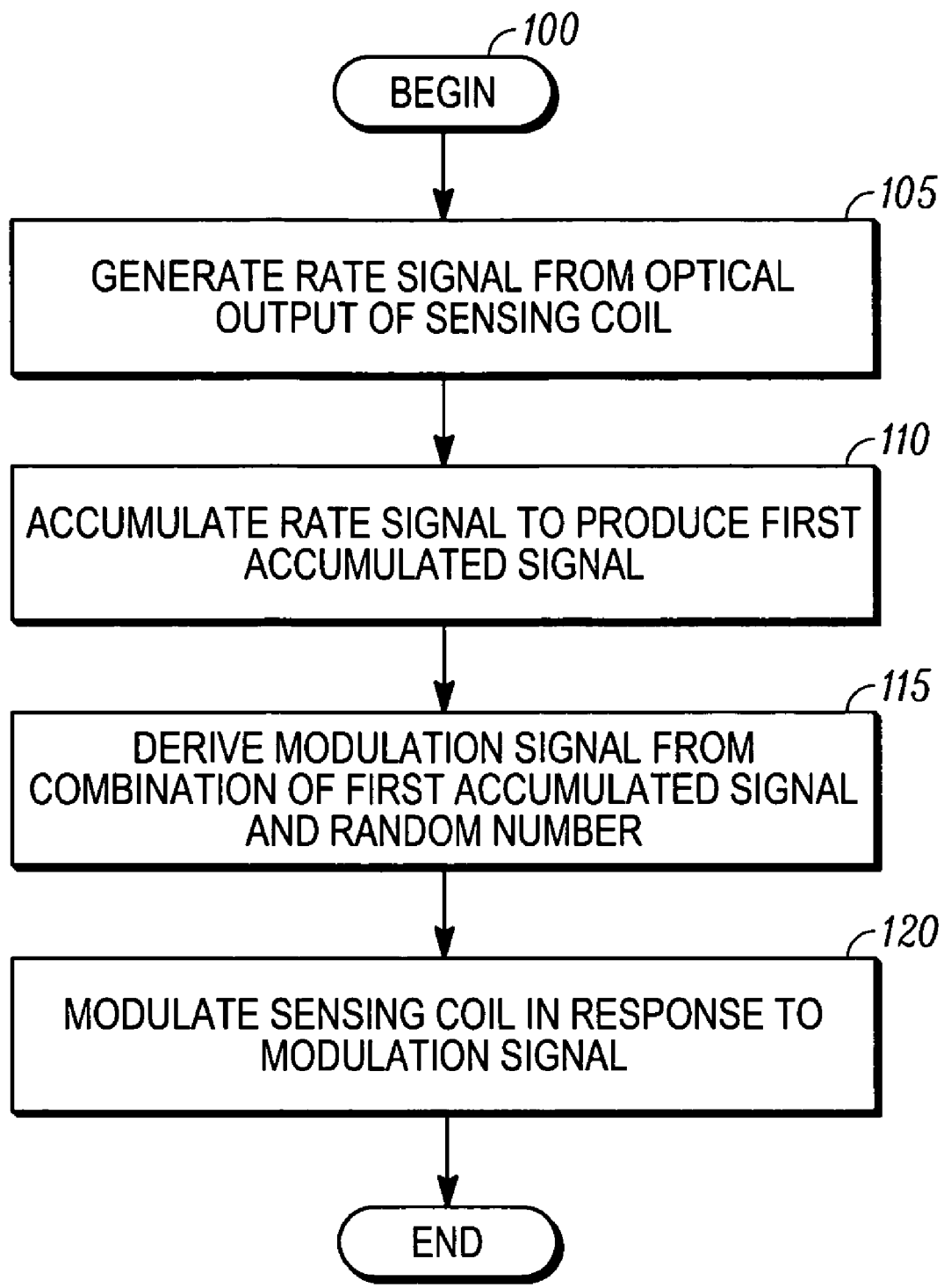
FIG. 3 is a flow diagram of a method for operating an optical gyro in accordance with an exemplary embodiment of the present invention.

Referring to FIGS. 1-3, FIG. 3 is a flow diagram of a method for operating an optical gyro, such as the optical gyros 10 and 60 in accordance with an exemplary embodiment of the present invention. The method begins at step 100. A rate signal is generated from an optical output of a sensing coil, as indicated at step 105. In one exemplary embodiment, the optical output is detected (e.g., via photodiode 24) from the sensing coil 18 and converting to a digital signal (e.g., via ADC 30), and the digital signal is demodulated (e.g., via demodulator 34) to produce the rate signal. The rate signal is accumulated to produce a first accumulated signal, as indicated at step 110. For example, the rate accumulator 36 accumulates the output of the demodulator 34 to produce the first accumulated signal.

A modulation signal is derived from a combination of the first accumulated signal and a random noise signal, as indicated at step 115. The modulation signal is derived at least once per loop transit period (e.g., the amount of time for a light beam to travel a single length of the optical path of the sensing coil 18). In one exemplary embodiment, the first accumulated signal is biased to produce a biased signal, the biased signals are accumulated to produce a second accumulated signal, the random number is added to the second accumulated signal to produce a ramp signal, and the ramp signal is converted to the modulation signal (e.g., via digital-to-analog conversion). For example, in the signal processing circuit 50, the summing unit 38 adds the output of the rate accumulator 36 with the bias modulation signal from the bias signal generator 40 to produce the biased signal. The ramp accumulator 42 produces the second accumulated signal from the output (e.g., biased signal) of the summing unit 38, the summing unit 44 adds the second accumulated signal from the ramp accumulator 42 with the random number from the random number generator 46, and the video DAC 47 converts the output of the summing unit 44 (e.g., the ramp signal) to an analog signal that is supplied to the modulator 20.

In another exemplary embodiment, the random number is first added (e.g., via summing unit 38) to the first accumulated signal to produce a modified signal, the modified signal is biased to produce the biased signal, the biased signal is accumulated to produce the second accumulated signal, and the ramp signal is converted to the modulation signal. For example, in the signal processing circuit 52, the summing unit 38 adds the first accumulated signal from the rate accumulator 36 with the random number from the random number generator 46, and the summing unit 44 adds the output (e.g., the modified signal) of the summing unit 38 with the bias modulation signal from the bias signal generator 40 to produce the biased signal. The biased signal is accumulated by the ramp accumulator 42, and the video DAC 47 converts the output of the ramp accumulator 42 (e.g., the ramp signal) to an analog signal that is supplied to the modulator 20.

In another exemplary embodiment, a modulation signal is determined to cancel the phase difference. A ramp signal is produced from the combination of the first accumulated signal and the random number, and the ramp signal is converted to an analog signal. In this exemplary embodiment, the modulation signal has a first resolution, the analog signal has a second resolution, and the random number has a size corresponding to the difference of the first resolution and the second resolution.

The modulation signal is applied to the sensing coil to cancel the phase difference of the circulating light beams from the sensing coil due to the rotation of the sensing coil, as indicated at step 120.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for driving a sensing coil, the circuit comprising:
    a photodetection circuit having an input for receiving an optical output from the sensing coil and having an output, said photodetection system producing a digital signal from said optical output;
    a signal processing circuit having an input coupled to said output of said photodetection circuit and having an output for supplying an output signal to modulate said sensing coil, said signal processing circuit configured to produce a feedback signal from said digital signal and further configured to add a random number to said feedback signal to produce said output signal;
    a digital-to-analog converter (DAC) having an input for receiving said output signal and having an output; and
    an amplifier having an input coupled to said output of said DAC and having an output for coupling with said sensing coil,
    wherein said DAC has a first resolution, wherein said signal processing circuit has a second resolution greater than said first resolution, and wherein said random number has a size corresponding to a difference between said second resolution and said first resolution.

2. A system according to claim 1, wherein the sensing coil has a loop transit period, and wherein said signal processing circuit is configured to produce said output signal at least once per said loop transit period.

3. A system according to claim 1, wherein said signal processing circuit comprises:
    a demodulator having an input for receiving said digital signal and having an output, said demodulator configured to produce a demodulated signal;
    a first accumulator having an input coupled to said output of said demodulator and having an output, said first accumulator configured to produce a first accumulated signal from said demodulated signal;
    a bias signal generator configured to produce a pre-determined bias signal;
    a first summing unit having a first input coupled to said output of said first accumulator, a second input coupled to said bias signal generator, and an output, said first summing unit configured to produce a first sum of said bias signal and said first accumulated signal;
    a second accumulator having an input coupled to said output of said first summing unit and having an output, said second accumulator configured to produce a second accumulated signal from said first sum of said bias signal and said first accumulated signal;
    a random number generator having an output and configured to produce a random number; and
    a second summing unit having a first input coupled to said output of said second accumulator, a second input coupled to said output of said random number generator, and an output, said second summing unit configured to produce a second sum of said random number and said second accumulated signal at said output of said second summing unit.

4. A system according to claim 1, wherein said signal processing circuit comprises:
    a demodulator having an input for receiving said digital signal and having an output, said demodulator configured to produce a demodulated signal;
    a first accumulator having an input coupled to said output of said demodulator and having an output, said first accumulator configured to produce a first accumulated signal from said demodulated signal;
    a random number generator configured to produce a random number;
    a first summing unit having a first input coupled to said output of said first accumulator, a second input coupled to said random number generator, and an output, said first summing unit configured to produce a first sum of said random number and said first accumulated signal;
    a bias signal generator configured to produce a pre-determined bias signal;
    a second summing unit having a first input coupled to said output of said first summing unit, a second input coupled to said bias signal generator, and an output, said second summing unit configured to produce a second sum of said bias signal and said first sum of said random number and said first accumulated signal; and
    a second accumulator coupled to said output of said second summing unit, said second accumulator configured to produce a second accumulated signal from said second sum of said bias signal and said first sum of said random number and said first accumulated signal.

5. A system according to claim 1, wherein said photodetector circuit comprises:
    a photodiode for producing a current in response to said optical output and having an output;
    an amplifier having an input coupled to said output of said photodiode and having an output; and
    an analog-to-digital converter (ADC) having an input coupled to said output of said amplifier and configured to produce said digital signal.

6. An optical gyro comprising:

a sensing coil circuit having an input and an output and configured to produce an optical output having a phase difference proportional to a rotational rate of the optical gyro;

a photodetection circuit having an input coupled to said output of said sensing coil circuit and having an output, said photodetection circuit configured to produce a digital signal representing said optical output; and a signal processing circuit having an input coupled to said output of said photodetection circuit and having an output coupled to said input of said sensing coil circuit, said signal processing circuit configured to produce a feedback signal from said digital signal and further configured to transmit an output signal to said sensing coil circuit for canceling said phase difference of said optical output, said output signal derived from a combination of said feedback signal and a random number, wherein said signal processing circuit comprises a digital-to-analog converter (DAC) having a first resolution, and wherein said signal processing circuit is further configured to determine with a second resolution a modulation signal for canceling said phase difference of said optical output, said second resolution greater than said first resolution, and wherein said random number has a size corresponding to a difference between said second resolution and said first resolution.

7. An optical gyro according to claim 6, wherein said sensing coil circuit comprises one of a resonator and an interferometer.

8. An optical gyro according to claim 6, wherein said sensing coil circuit has a loop transit period, and wherein said signal processing circuit is configured to produce said output signal at least once per said loop transit period.

9. An optical gyro according to claim 6, wherein said sensing coil circuit comprises:

a sensing coil for routing counter-propagating light beams around a predetermined area; and a modulator coupled to said sensing coil and having an input coupled to said output of said signal processing circuit, said modulator configured to modulate said counter-propagating light beams using said output signal.

10. An optical gyro according to claim 6, wherein said photodetection circuit comprises:

a photodiode for producing a current in response to said optical output;

an amplifier having an input coupled to said photodiode and having an output;

a filter circuit having an input coupled to said output of said amplifier; and an analog-to-digital converter (ADC) having an input coupled to said output of said filter and configured to produce said digital signal from said current.

11. An optical gyro according to claim 6, wherein said signal processing circuit is further configured to produce a rate accumulated signal from said digital signal; said feedback signal derived from said rate accumulated signal; and wherein said signal processing circuit comprises:

a DAC configured to produce an analog signal from a sum of said feedback signal and said random number, said output signal derived from said analog signal; and a random number generator for producing said random number.

12. A method for operating an optical gyro having a sensing coil, the sensing coil for circulating light and producing an optical output having a phase difference during rotation of the sensing coil, the method comprising the steps of:

generating a rate signal from the optical output of the sensing coil;

accumulating the rate signal to produce a first accumulated signal;

deriving a modulation signal from a combination of the first accumulated signal and a random noise signal; and applying the modulation signal to the sensing coil to cancel the phase difference, wherein said deriving step comprises:

determining the modulation signal to cancel the phase difference, the modulation signal having a first resolution;

producing a ramp signal from the combination of the first accumulated signal and the random number; and converting the ramp signal to an analog signal at a second resolution, the random number having a size of a difference of the first resolution and the second resolution.

13. A method according to claim 12, wherein the sensing coil has a loop transit period, and wherein said step of deriving is performed at least once per loop transit period.

14. A method according to claim 12, wherein said generating step comprises:

detecting the optical output from the sensing coil;

converting the optical output to a digital signal; and demodulating the digital signal to produce the rate signal.

15. A method according to claim 12, wherein said deriving step comprises:

biasing the first accumulated signal to produce a biased signal;

accumulating the biased signal to produce a second accumulated signal;

adding the random number to the second accumulated signal to produce a ramp signal; and digital-to-analog converting the ramp signal to the modulation signal.

16. A method according to claim 12, wherein said deriving step comprises:

adding a random number to the first accumulated signal to produce a modified signal;

biasing the modified signal to produce a biased signal;

accumulating the biased signal to produce a second accumulated signal; and digital-to-analog converting the ramp signal to the modulation signal.

\* \* \* \* \*

UNITED STATES PATENT AND TRADEMARK OFFICE
CERTIFICATE OF CORRECTION

PATENT NO. : 7,583,384 B2
APPLICATION NO. : 11/495266
DATED : September 1, 2009
INVENTOR(S) : Keith et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 328 days.

Signed and Sealed this

Fourteenth Day of September, 2010

David J. Kappos
*Director of the United States Patent and Trademark Office*